United States Patent [19]

Nagai et al.

[11] Patent Number: 4,995,687
[45] Date of Patent: Feb. 26, 1991

[54] SEMICONDUCTOR LASER DEVICE AND A METHOD OF PRODUCING SAME

[75] Inventors: Seiichi Nagai; Mitsuo Ishii; Kazuyoshi Hasegawa, all of Itami, Japan

[73] Assignee: Mitsubishi Denki Kabushiki Kaisha, Japan

[21] Appl. No.: 425,021

[22] Filed: Oct. 23, 1989

[30] Foreign Application Priority Data

Nov. 18, 1988 [JP] Japan ................................. 63-293415

[51] Int. Cl.$^5$ ................................................ G02B 6/42
[52] U.S. Cl. ...................................... 350/96.2; 357/74; 357/81
[58] Field of Search ................. 350/96.2, 96.21, 96.22, 350/96.15; 250/227.11; 357/17, 19, 30, 74, 81

[56] References Cited

U.S. PATENT DOCUMENTS

| 726,648 | 2/1988 | Haberland et al. | 350/96.20 |
| 4,610,746 | 9/1986 | Broer et al. | 156/275.5 |
| 4,707,067 | 11/1987 | Haberland et al. | 350/96.20 |

FOREIGN PATENT DOCUMENTS 61-43490  3/1986  Japan .
62-130582 6/1987  Japan .

Primary Examiner—Frank Gonzalez
Assistant Examiner—Galen J. Hansen
Attorney, Agent, or Firm—Leydig, Voit & Mayer

[57] ABSTRACT

A semiconductor laser device and method of producing the same in which a laser diode chip is mounted on a stem via a heat sink. The cap is fixed to the stem covering the chip and includes a penetrating aperture, a lens for collimating light from the chip into penetrating aperture, and an optical fiber for guiding the collimated light which is fixed to the penetrating aperture after insertion to a desired depth.

4 Claims, 1 Drawing Sheet

F I G .1.
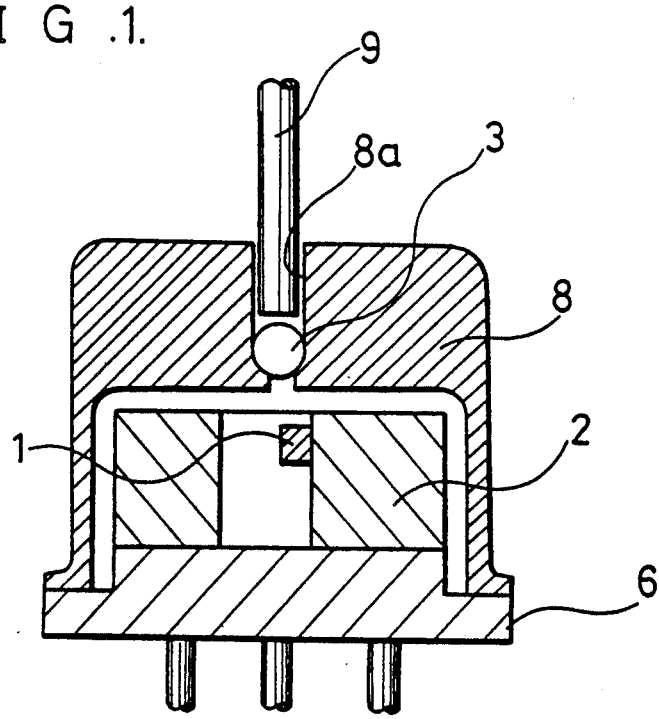

SEMICONDUCTOR LASER DEVICE AND A METHOD OF PRODUCING SAME

FIELD OF THE INVENTION

The present invention relates to a semiconductor laser device and a method of producing same, and, more particularly, to a laser used in light communication with an optical fiber.

BACKGROUND OF THE INVENTION

FIG. 2 shows a cross-sectional structural view of a prior art semiconductor laser device. In FIG. 2, reference numeral 1 designates an laser diode (hereinafter referred to as "LD") chip. This LD chip 1 is mounted on a heat sink 2 comprising silver or copper. Spherical lens 3 which is held by copper lens holder 4 which is mounted on heat sink 2 by solder 5 to collimate light from LD chip 1. Heat sink 2 is disposed on iron stem 6.

Silver or copper heat sink 2 is mounted on iron stem 6 so that the light emission point of LD chip 1 coincides with the center axis of stem 6, and copper lens holder so that the axis of lens 3 coincides with the light emission point of LD chip 1. Cap 8' having window glass 7 is welded to this stem 6.

The optical axis alignment in the production process of this prior art laser device will be described.

In this prior art device, the optical axis alignment has been conducted as in the following. That is, a light receiving apparatus is provided opposite to the LD chip 1, and the LD chip 1 is energized to emit light with the lens holder 4 mounted on the heat sink 2 by solder 5. The lens holder 4 is slightly moved in the X and Y direction while monitoring with the light receiving apparatus, and the holder 4 is fixed in a position where the optical axis is aligned. Thereafter, the device is heated and cooked so that the holder 4 is fixed to the heat sink 2 by solder 5.

In the laser device produced as such, the optical axis alignment in the X and Y direction are conducted, and the light emission point of the LD chip 1 is made coincident with the center axis of the stem 6. Accordingly, high coupling efficiency with an optical fiber is obtained.

In the prior art semiconductor laser device, however, there may arise variations in the optical axis alignment positions in the X axis direction due to variations in the attachment positions of the LD chip to the heat sink and variations in the thickness of solder which fixes the lens holder, and accordingly the coupling efficiency with an optical fiber is likely to vary from device to device.

SUMMARY OF THE INVENTION

An object of the present invention is to provide a semiconductor laser device for conducting optical axis alignment in the Z direction, having a good coupling efficiency with an optical fiber, and having fewer variations in the coupling efficiency from device to device.

Another object of the present invention is to provide a method of producing such a semiconductor laser device.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, a penetrating aperture for holding a lens and for receiving an optical fiber to a desired depth and fixed is provided with the cap. Accordingly, an optical axis alignment can be conducted in the X, Y, and Z directions, good coupling efficiency with an optical fiber is obtained and variations in the coupling coefficient from device to device are reduced.

BRIEF DESCRIPTION OF THE DRAWINGS

FIG. 1 is a cross-sectional view showing a semiconductor laser device according to an embodiment of the present invention.

DETAILED DESCRIPTION OF THE PREFERRED EMBODIMENTS

Figure 2:
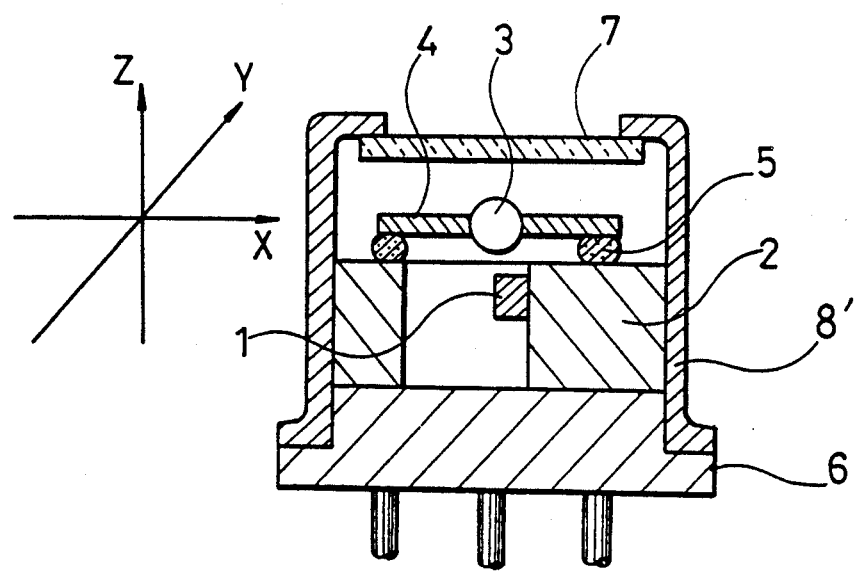
FIG. 2 is a cross-sectional view showing a semiconductor laser device according to the prior art.

An embodiment of the present invention will be described in detail with reference to drawing.

FIG. 1 shows a semiconductor laser device according to an embodiment of the present invention. In FIG. 1, reference numeral 1 designates LD chip. LD chip 1 is mounted on silver or copper heat sink 2. Heat sink 2 is disposed on iron stem 6. A Kovar (a trademark for a known iron-nickel-cobalt alloy) cap 8 is disposed on stem 6 covering LD chip 1 mounted on heat sink 2. Spherical lens 3 is disposed in a penetrating aperture 8a at the center of cap 8. Optical fiber 9 is inserted in penetrating aperture 8a.

The heat sink 2 is mounted on the stem 6 so that the light emitting point of the LD chip 1 coincides with the center axis of the stem 6, and a cap 8 provided with the spherical lens 3 and optical fiber 9 is welded onto the stem 6 covering the LD chip 1.

The optical axis alignment in the production process of this embodiment laser device will be described.

First of all, a heat sink 2 onto which the LD chip 1 is bonded is mounted on a stem 6 so that the light emitting point of the LD chip 1 coincides with the center axis of the stem 6. Thereafter a cap 8 is covering the stem 6 with a lens 3 held in the penetrating aperture 8a of the cap 8 is mounted on the stem 6 the penetrating aperture 8a of the cap 8 is formed by a mechanical processing such as drilling, and in case where the number of products is large, a press may be employed. Next, the LD chip 1 is made energized to emit light, and the emitted light is monitored by a light receiving apparatus (not shown) disposed opposite the LD chip 1. The cap 8 is slightly moved in the X and Y directions, and at a position where the optical axis is aligned, the cap 8 is welded onto the stem 6 by a capping apparatus. Thereafter, an optical fiber 9 is inserted into the penetrating aperture 8a of the cap 8, and the LD chip 1 is energized to emit light and the light emission at the other end of the optical fiber 9 is monitored by a light receiving apparatus. The optical fiber 9 is slightly moved in the Z axis direction, and at a position where the optical axis is aligned, the optical fiber 9 is fixed to the cap 8 by a plastic adhesive (not shown) such as an epoxy resin.

In the embodiment constructed as described above, because the optical axis alignments are carried out in the X and Y directions as well as in the Z direction, the coupling efficiency with an optical fiber is improved, and variations in the coupling coefficient from device to device is reduced.

Furthermore, when a capping apparatus capable of slightly moving in X and Y directions is used, the optical axis alignments in the X and Y directions can be automatic, and a large enhancement in the production efficiency is achieved.

While in the above illustrated embodiment the optical axis alignment in the Z direction is carried out after the optical axis alignments in the X and Y directions, the optical axis alignments in the X, Y, and Z directions can be carried out at the same time using a capping apparatus capable of handling an optical fiber. In this case, the production efficiency is further enhanced.

As discussed above, according to the present invention, in a semiconductor laser device in which a laser diode chip is mounted on a stem via a heat sink and a cap is welded to a stem, the cap includes a penetrating aperture for holding a lens and receiving an optical fiber inserted to a desired depth, so that the optical axis alignments should be carried out along the X, Y, and Z axes. Accordingly, good coupling efficiency with an optical fiber is obtained and variations in the coupling efficiency with an optical fiber from device to device can be greatly reduced.

What is claimed is:

1. A semiconductor laser comprising a stem having a central portion and a peripheral flange outwardly extending therefrom, a heat sink mounted on said central portion of said stem, a laser diode chip mounted on said heat sink, a cap having a top, a generally cylindrical side wall with an inside dimension larger than said central portion of said stem, and a peripheral skirt transverse to said side wall extending from said side wall and fixedly mounted on said peripheral flange of said stem so that said cap covers said chip, said top of said cap including a penetrating aperture aligned with said laser diode chip, a lens disposed in said penetrating aperture proximate said laser diode chip for collimating light emitted from said laser diode chip, and an optical fiber disposed in the penetrating aperture at a desired depth and fixedly mounted to said cap for guiding the collimated light, whereby said cap and stem can be adjusted relative to each other in a plane before being fixedly mounted to each other and said optical fiber can be adjusted in the penetrating aperture before being fixedly mounted to said cap to achieve a desired coupling of light between said laser diode chip and said optical fiber.

2. A semiconductor laser device as defined in claim 1, wherein said cap is Kovar alloy.

3. A semiconductor laser device as defined in claim 1, wherein said lens is a spherical lens.

4. A method of producing a semiconductor laser device comprising:

mounting a laser diode chip on a heat sink;

mounting the heat sink on the central portion of a stem including a peripheral flange outwardly extending from the central portion of the stem;

setting a cap having a top including a penetrating aperture, a generally cylindrical side wall, and a peripheral skirt transverse to said side wall on the peripheral flange of the stem with the skirt in contact with the flange, the cylindrical side wall having a larger inside dimension than the central portion of the stem;

inserting a lens and optical fiber into the penetrating aperture in the cap;

aligning an optical axis of the laser diode chip with an axis of the optical fiber by moving the cap relative to the stem with the peripheral skirt in contact with the peripheral flange while monitoring light emitted by the laser diode chip;

fixing the peripheral flange to the peripheral skirt after aligning the optical axes of the laser diode chip and the optical fiber;

adjusting the depth of the optical fiber in the penetrating aperture to achieve a desired light coupling between the laser diode chip and the optical fiber; and fixing the optical fiber in the penetrating aperture of the cap after adjusting the depth of the optical fiber.

* * * * *